United States Patent
Petit

(10) Patent No.: US 7,080,759 B2
(45) Date of Patent: Jul. 25, 2006

(54) DISPENSING HEAD AND FLUID PRODUCT DISPENSER COMPRISING SAME

(75) Inventor: Ludovic Petit, Vitot (FR)

(73) Assignee: Valois S.A.S., Le Neubourg (FR)

( * ) Notice: Subject to any disclaimer, the term of this patent is extended or adjusted under 35 U.S.C. 154(b) by 126 days.

(21) Appl. No.: 10/399,856

(22) PCT Filed: Oct. 19, 2001

(86) PCT No.: PCT/FR01/03256

§ 371 (c)(1),
(2), (4) Date: Sep. 4, 2003

(87) PCT Pub. No.: WO02/35121

PCT Pub. Date: May 2, 2002

(65) Prior Publication Data

US 2004/0026457 A1    Feb. 12, 2004

(30) Foreign Application Priority Data

Oct. 23, 2000  (FR) .................................. 00/13570

(51) Int. Cl.
*B65D 88/054*    (2006.01)
(52) U.S. Cl. .............................. 222/321.2; 222/321.8; 222/491
(58) Field of Classification Search .. 222/321.1–321.9, 222/380, 491, 494, 496; 128/200.4
See application file for complete search history.

(56) References Cited

U.S. PATENT DOCUMENTS

| | | | | |
|---|---|---|---|---|
| 1,879,012 A | * | 9/1932 | Armstrong | ................... 239/118 |
| 2,173,072 A | * | 9/1939 | Loepsinger | ................... 239/118 |
| 2,720,422 A | * | 10/1955 | Mercur | ........................ 222/174 |
| 3,393,873 A | | 7/1968 | Larson | |
| 4,121,619 A | | 10/1978 | Pauliukonis | |
| 4,162,763 A | | 7/1979 | Higgins | |
| 5,176,296 A | | 1/1993 | Lina et al. | |
| 5,323,933 A | * | 6/1994 | Brakarz et al. | ........... 222/321.2 |
| 5,348,189 A | * | 9/1994 | Cater | ............................. 222/1 |
| 5,664,706 A | * | 9/1997 | Cater | ....................... 222/321.2 |
| 5,765,752 A | | 6/1998 | Herr et al. | |

FOREIGN PATENT DOCUMENTS

WO     WO 99/36185 A1    7/1999

* cited by examiner

*Primary Examiner*—Michael Mar
*Assistant Examiner*—Melvin A Cartagena
(74) *Attorney, Agent, or Firm*—Sughrue Mion, PLLC

(57) ABSTRACT

A fluid dispenser device comprising a pump (50) and a dispensing head that comprises a body (1) defining a fluid discharge channel (2) ending in a dispensing orifice (3), a rigid insert (4) being disposed in said discharge channel (2), said rigid insert forming or being secured to the outlet valve of said pump, said fluid dispenser device being characterized in that said dispensing head further comprises a closure element (10) disposed in said discharge channel (2), said closure element (10) being mounted to move and/or to deform between a closure position in which it closes off the discharge channel (2) and a non-closure position in which it does not close off the discharge channel (2), said rigid insert (4) being mounted to move inside said discharge channel (2) between a rest position and an actuating position, said closure element (10) co-operating at one end with said rigid insert (4) and at the other end with said body (1) so that, when the insert (4) is in the rest position, the closure element (10) is in the closure position, and when the insert (4) is in the actuating position, the closure element (10) is moved and/or deformed into its non-closure position.

10 Claims, 2 Drawing Sheets

DISPENSING HEAD AND FLUID PRODUCT DISPENSER COMPRISING SAME

The present invention relates to a fluid dispenser including a dispensing head, and in particular a dispensing head incorporating closure means for closing off the dispensing orifice.

Closure means for closing off dispensing orifices in fluid dispensers are well known from the state of the art. Several types exist. A first family of closure means comprise those that are urged elastically into their closure positions and that are deformed or moved by the pressure of the fluid being dispensed for the purpose of opening the dispensing orifices. Such a device can include closure means made of a deformable material, or closure means made in the form of a piston mounted to slide in the discharge channel away from the dispensing orifice under the effect of the pressure exerted by the fluid. Another family of closure means comprises closure means that are deformed mechanically by a portion of the dispensing head whenever the device is actuated to dispense a metered quantity or "dose" of fluid. In which case, opening the closure means is independent of the pressure exerted by the fluid.

Although such closure means operate reasonably well, they suffer from the drawback of being relatively complicated to manufacture and to assemble, and therefore of being costly. Generally, they require the dispensing head to be modified to make it possible to fit the closure means to it, which also involves increasing the cost of manufacturing the fluid dispenser device. In addition, when the dispensing head incorporates a spray profile, the presence of the closure means generally deforms the geometrical shape of said spray profile, which is detrimental to the quality of spraying when discharging the fluid.

An object of the present invention is to provide a fluid dispensing head for a fluid dispenser, which dispensing head does not reproduce the above-mentioned drawbacks.

Another object of the present invention is to provide a dispensing head that is simple to manufacture and to assemble, and that does not require the dispensing head to be modified.

Yet another object of the present invention is to provide a dispensing head for a fluid dispenser, in which dispensing head the geometrical shape of the spray profile at the dispensing orifice is not modified when the fluid is discharged, thereby guaranteeing optimum spray quality.

A further object of the present invention is to provide a fluid dispenser including such a dispensing head.

To these ends, the present invention provides a fluid dispenser device comprising a pump and a dispensing head that comprises a body defining a fluid discharge channel ending in a dispensing orifice, a rigid insert being disposed in said discharge channel, said rigid insert forming or being secured to the outlet valve of said pump, said fluid dispenser device being characterized in that said dispensing head further comprises a closure element disposed in said discharge channel, said closure element being mounted to move and/or to deform between a closure position in which it closes off the discharge channel and a non-closure position in which it does not close off the discharge channel, said rigid insert being mounted to move inside said discharge channel between a rest position and an actuating position, said closure element co-operating at one end with said rigid insert and at the other end with said body so that, when the insert is in the rest position, the closure element is in the closure position, and when the insert is in the actuating position, the closure element is moved and/or deformed into its non-closure position.

Advantageously, said closure element is a deformable hollow sleeve assembled around the downstream end of said rigid insert in the direction in which the fluid flows, one end of said deformable sleeve co-operating with the end-wall of said discharge channel, and the other end of the deformable sleeve co-operating with a radial shoulder of said insert.

Advantageously, said deformable sleeve is elastically deformed into its closure position by the rigid insert which, in its rest position, exerts an axial compression force on said deformable sleeve, said deformable sleeve returning elastically to its non-closure position when the rigid insert is moved into its actuating position, in which it no longer exerts any axial compression force on said deformable sleeve.

Advantageously, the downstream end of said rigid insert extends beyond said deformable sleeve and co-operates, preferably in leaktight manner, with said dispensing orifice, when said rigid insert is in the rest position.

Advantageously, the end-wall of said discharge channel has a spray profile.

Advantageously, the pump has a piston for dispensing the fluid, said rigid insert forming or being secured to the outlet valve of said pump, being moved into its actuating position at the end of the actuating stroke of the piston of the pump, and being returned to its rest position at the end of discharge of the fluid.

Other advantages and characteristics of the invention will appear more clearly on reading the following detailed description with reference to the accompanying drawings which are given by way of non-limiting example, and in which:

FIGS. 1 and 2 show the end portion of a nasal dispensing head, but the present invention is also adaptable to dispensing heads of some other type.

Figure 1:
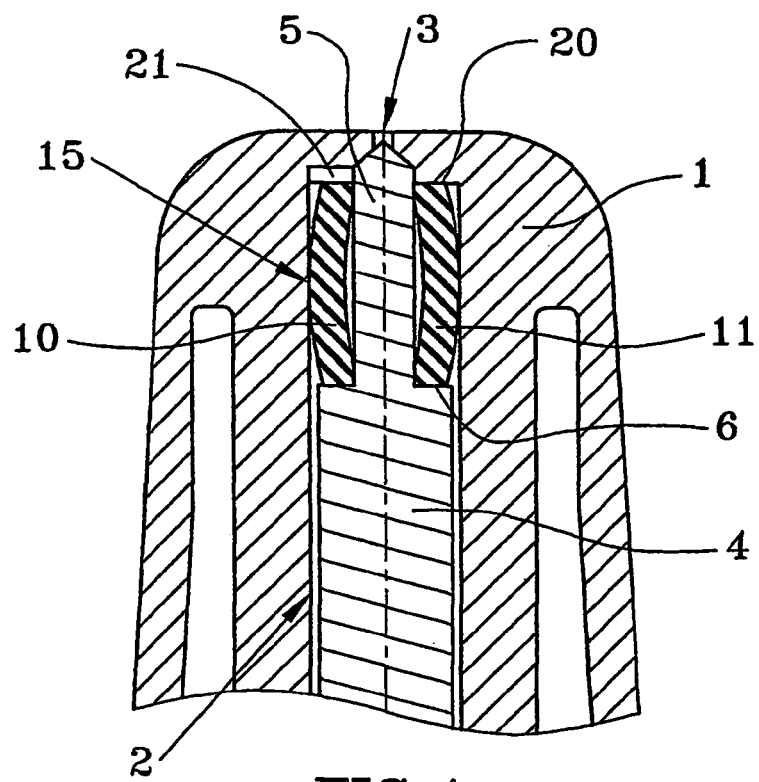
FIG. 1 is a diagrammatic section view of a portion of a dispensing head in an advantageous embodiment of the invention, in the closure position.
Figure 2:
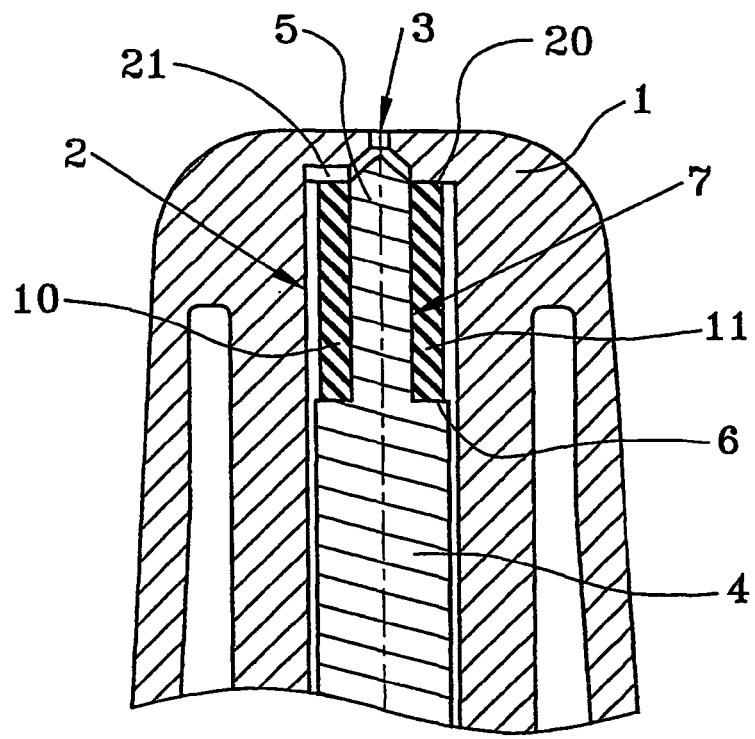
FIG. 2 is a view similar to the FIG. 1 view, in the dispensing position.

As shown in FIGS. 1 and 2, the dispensing head comprises a body 1 defining a discharge channel 2 which ends in a dispensing orifice 3. A rigid insert 4 is disposed in the discharge channel 2, making it possible to limit the dead volume of the discharge channel, thereby defining a narrow passageway for the fluid, making it easier to spray it through the dispensing orifice. Advantageously, the dispensing head has a spray profile 21, preferably formed in the end-wall 20 of the discharge channel 2, the dispensing orifice 3 then being situated at the center of said spray profile 21. Preferably, and in known manner, the spray profile may comprise swirl channels which are connected to a swirl chamber disposed directly upstream from the dispensing orifice 3.

In the invention, the rigid insert 4 is mounted to move inside the dishcarge channel 2, between a rest position shown in FIG. 1, and an actuating position shown in FIG. 2. A closure element 10 is also disposed in the discharge channel 2, and it co-operates at one end with the body 1 of the dispensing head and at the other end with the rigid insert 4 so that, when the rigid insert 4 is in the rest position, the closure element 10 closes off the discharge channel 2 preferably in leaktight manner, thereby preventing the fluid from passing through towards the dispensing orifice 3. When the rigid insert 4 is in the actuating position, the closure element 10 is moved and/or deformed towards a non-closure position, in which it opens up the passageway inside the discharge channel 2 to allow the fluid to pass through towards the orifice 3.

With reference to FIGS. 1 and 2, which show an advantageous embodiment of the invention, the closure element 10 is implemented in the form of a hollow sleeve made of a deformable material, e.g. of an elastomer material, which sleeve is engaged around a downstream end 5 of the rigid insert 4. The closure element 10, i.e. the sleeve, co-operates at one end with the end-wall 20 of the discharge channel 2 and at the other end with a shoulder 6 of the rigid insert 4, which shoulder defines the downstream end 5 of said insert. As shown in the figures, when the rigid insert 4 is in the rest position, the deformable sleeve 10 is preferably deformed by an axial compression force exerted by the rigid insert 4 on said sleeve 10, so that it presses against the side wall 15 of the discharge channel 2 so as to provide peripheral sealing there, as shown in FIG. 1. When the rigid insert 4 is moved towards its actuating position, when the fluid is discharged, the insert no longer exerts this axial compression force on the deformable sleeve 10, which returns elastically to its non-deformed position shown in FIG. 2 and in which it is pressed against the outside wall 7 of the downstream end 5 of the insert 4, thereby opening up the passageway through the discharge channel 2.

Advantageously, as described above, the end-wall 20 of the discharge channel 2 may have a spray profile 21. In which case, the embodiment shown in the figures offers a major advantage in that, in the actuating position, the spray profile 21 has a non-modified geometrical shape because, in the actuating position, the closure element 10 formed by the hollow sleeve is in its non-deformed position, said sleeve then forming the end-walls of the spray channels. This is very different from currently existing closure means made of deformable material that are generally deformed elastically into their non-closure position, so that the spray profile is unavoidably modified at the time of discharge, which can degrade the quality of the spray. That drawback is not reproduced by the present invention, as can be seen clearly in the figures.

Advantageously, as also shown in the figures, the downstream end 5 of the rigid insert 4 extends beyond the hollow sleeve 10, and co-operates, preferably in leaktight manner, with the dispensing orifice 3 when said rigid insert 4 is in the rest position. In addition to providing double sealing, this embodiment makes it possible to procure closure at the dispensing orifice 3 itself, which is not procured by the deformable sleeve 10 which exerts its closure sealing inside the discharge channel 2. This avoids any risk of contaminating the fluid remaining inside the swirl chamber or inside the spray profile after the dose has been discharged.

Figure 3:
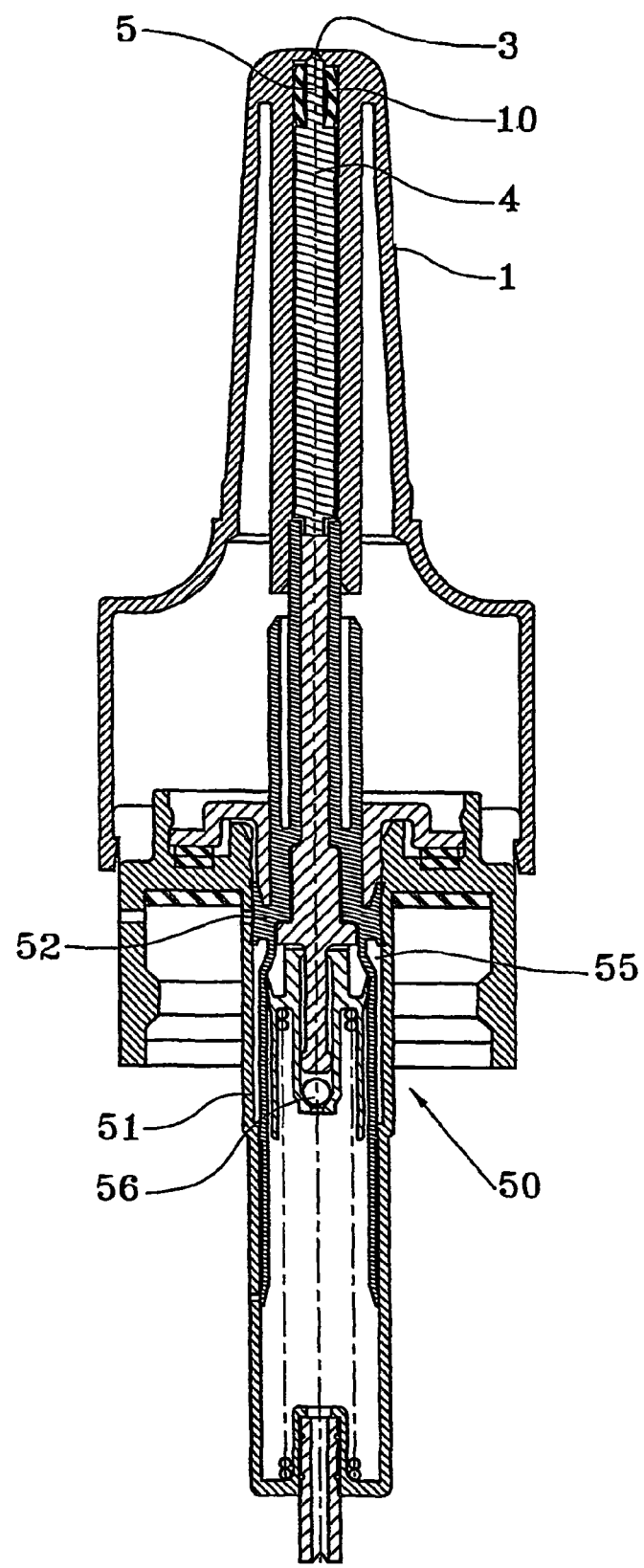
FIG. 3 is a diagrammatic section view of a fluid dispenser in an advantageous embodiment of the invention The present invention relates to a dispensing head provided with closure means.

The dispensing head of the present invention is applicable to all types of fluid dispenser device. FIG. 3 shows an advantageous embodiment of a dispenser having a dispensing head as described above. It includes a reservoir (not shown) containing the fluid to be dispensed, and receiving a dispensing member such as a pump 50 which comprises a piston 51 slidably received in a pump body 52. By actuating said piston 51, it is possible selectively to dispense the fluid contained in the reservoir. A pump chamber 55 is defined between an inlet valve 56 which connects the pump chamber 55 to the reservoir, and an outlet valve which connects the pump chamber 55 to the discharge channel 2 of said dispensing head. Advantageously, the rigid insert 4 is secured to said outlet valve, so that it is moved from its rest position to its actuating position when the outlet valve is opened, thereby enabling the fluid to be discharged from said pump chamber 55. In particular, said rigid insert 4 itself forms the outlet valve of the pump 50, and said rigid insert 4 is moved from its rest position to its actuating position at the end of the actuating stroke of the piston 51 of the pump, thereby guaranteeing that the discharge channel 2 and the dispensing orifice 3 are opened at the exact time when the fluid contained in the pump chamber 55 is discharged. At the end of discharging of the fluid, the outlet valve is closed again, thereby returning the insert 4 to its rest position, which deforms the closure means 10 into their closure position (cf. FIG. 1). The closure means are thus opened and closed mechanically by opening and closing the outlet valve of the pump 50.

The present invention is described with reference to an advantageous embodiment of it, but naturally various modifications may be made to this embodiment without going beyond the ambit of the present invention as defined by the accompanying claims.

The invention claimed is:

1. A fluid dispenser device comprising a manually actuated pump (50) that is actuated by exerting a manual pressure and a dispensing head that comprises a body (1) defining a fluid discharge channel (2) ending in a dispensing orifice (3), a rigid insert (4) being disposed in said discharge channel (2), said rigid insert forming or being secured to an outlet valve of said pump, wherein said dispensing head further comprises a closure element (10) disposed in said discharge channel (2), said closure element (10) being mounted to move or to deform between a closure position in which the closure element closes off the discharge channel (2) and a non-closure position in which the closure element does not close off the discharge channel (2), said rigid insert (4) being mounted to move inside said discharge channel (2) between a rest position and an actuating position, said closure element (10) co-operating at one end with said rigid insert (4) and at the other end with said body (1) so that, when the insert (4) is in the rest position, the closure element (10) is in the closure position, and when the insert (4) is in the actuating position, the closure element (10) is moved or deformed into the closure element's non-closure position; and wherein the pump comprises a piston for dispensing the fluid, said rigid insert forming or being secured to the outlet valve of said pump and being moved into the actuating position at the end of the actuating stroke of the piston of the pump, and being returned to the rest position at the end of discharge of the fluid.

2. A device according to claim 1, in which said closure element is a deformable hollow sleeve (10) assembled around the downstream end (5) of said rigid insert (4) in the direction in which the fluid flows, one end (11) of said deformable sleeve (10) co-operating with the end-wall (20) of said discharge channel (2), and the other end (12) of the deformable sleeve (10) co-operating with a radial shoulder (6) of said insert (4).

3. A device according to claim 2, in which said deformable sleeve (10) is elastically deformed into its closure position by the rigid insert (4) which, when in the rest position, exerts an axial compression force on said deformable sleeve (10), said deformable sleeve (10) returning elastically to the non-closure position when the rigid insert (4) is moved into the actuating position, in which the rigid insert no longer exerts any axial compression force on said deformable sleeve (10).

4. A device according to claim 2, in which the downstream end (5) of said rigid insert (4) extends beyond said deformable sleeve (10) and co-operates with said dispensing orifice (3), when said rigid insert (4) is in the rest position.

5. The device according to claim 4, wherein the downstream end of the rigid insert co-operates in leaktight manner with the dispensing orifice when said rigid insert (4) is in the rest position.

6. A device according to claim 1, in which the end-wall (20) of said discharge channel (2) has a spray profile (21).

7. The device according to claim 1, wherein a downstream end of the rigid insert extends beyond said closure element and co-operates in leaktight manner with said dispensing orifice (3), when said rigid insert (4) is in the rest position.

8. The device according to claim 1, wherein at least a portion of the rigid insert axially slides relative to the closure element when the rigid inserts moves between the rest position and the actuating position.

9. The device according to claim 8, wherein at least a portion of the rigid insert axially slides within the closure element when the rigid inserts moves between the rest position and the actuating position.

10. The device according to claim 1, wherein a portion of the closure element deforms radially outwardly and radially away from the rigid insert when moving from the non-closure position to the closure position.

* * * * *